June 23, 1970 M. WEISS 3,517,321

RISE TIME DISCRIMINATOR

Filed Feb. 17, 1967

INVENTOR
MARVIN WEISS

United States Patent Office 3,517,321

Patented June 23, 1970

3,517,321

RISE TIME DISCRIMINATOR

Marvin Weiss, Hicksville, N.Y., assignor to Burroughs Corporation, Detroit, Mich., a corporation of Michigan Filed Feb. 17, 1967, Ser. No. 616,931
Int. Cl. H03k 5/20
U.S. Cl. 328—114 14 Claims

ABSTRACT OF THE DISCLOSURE

The invention relates to a discriminator circuit, which includes a differential amplifier used to block all signals having a rate of rise smaller than a predetermined rate. In order for a signal to be passed by the circuit, its rate of rise must be greater than the charging rate of a capacitive charging circuit coupled to one input of the differential amplifier.

This invention relates generally to a rise time discriminator circuit and more specifically to an electronic circuit for suppressing all pulses which have a rise time slower than a predetermined value and for passing all pulses which have a rise time faster than this predetermined value.

In modern optical print readers, it is necessary for the device to be able to discriminate between a printed character and background imperfections such as flaws in the paper and smears of type material. Without some type of error detector or discriminator being employed in the circuit, these imperfections would result in either a faulty readout or the generation of a "can't read" signal. In either instance, an operator would be required to correct the situation resulting in a slower reading time and a more costly operation.

The signals generated by the character sensing means in response to background imperfections or smudges of type are characterized by having a smaller rate of rise than signals generated by the sensing of a character.

It is, therefore,, an object of my invention to improve the existing optical read systems by the addition of means for distinguishing between background defects and the printed matter.

It is a further object of my invention to provide an electronic circuit capable of distinguishing between undesirable signals and desired signals, based on the characteristic differences in the rise times thereof.

It is a further object of my invention to provide a circuit for distinguishing between proper and improper signals by blocking signals having rates of rise smaller than a predetermined rate and passing signals having rates of rise greater than this predetermined rate.

It is still a further object of my invention to provide a circuit which blocks slow rise time signals and passes high rise time signals wherein the flat portion and trailing edge of the high rise time signals are passed in a substantially undistorted form.

In carrying out these and other objects of my invention I provide a discriminator circuit which passes only signals having rates of rise faster than a predetermined value. The circuit includes a differential amplifier, the input signals being coupled to a first input thereof and capacitive charging circuit means having a charging rate equal to said predetermined value being coupled to a second input thereof. Unidirectional means couple the inputs of the amplifier for clamping the voltage at the second input at a value which is greater than the voltage at the first input thereby maintaining the second active element of the differential amplifier in a normally conductive state and the first active element in a normally non-conductive state until an input signal having a rate of rise greater than the predetermined value occurs, and for decoupling the inputs from each other upon the occurrence of such a signal. Means are provided for halting thec harging of the charging circuit upon the occurrence of a signal having a rate of rise greater than the predetermined rate and for reversing the conductive states of the active elements of the differential amplifier thereby producing an output.

Various other objects, advantages, and features of my invention will become more apparent in the following specification with its appended claims and the accompanying drawings, in which:

Figures 1, 2:
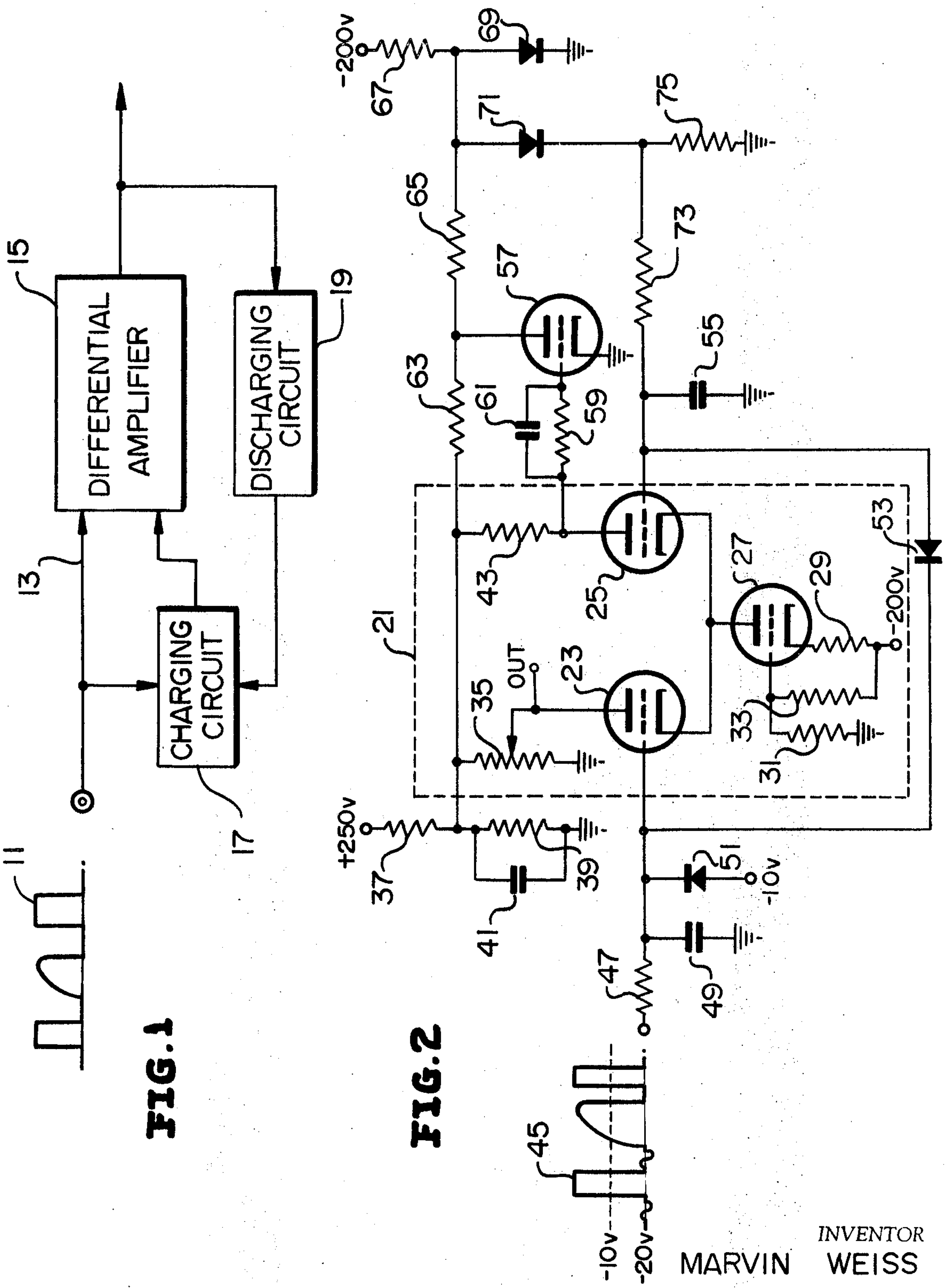
FIG. 1 is a block diagram of the circuit embodying my invention.
FIG. 2 is a schematic diagram of the preferred embodiment of my rise time discriminator circuit.

My invention can best be understood by referring to the following detailed description of the illustrated embodiment.

Referring now to FIG. 1 of the drawings, input signal 11 is applied to signal input 13 of the differential amplifier 15. Charging circuit 17 is coupled to the other input of the differential amplifier 15. The output of the differential amplifier is fed back through discharging network 19 for controlling charging network 17.

In operation, the input signal 11 is applied to input 13 of differential amplifier 15 and to charging network 17. The output of charging network 17 is compared to the input signal 11 in the differential amplifier 15. If the rate of rise of the input signal 11 is faster than the charging rate of charging circuit 17, differential amplifier 15 transmits the signal 11 to the output. The presence of an output signal activates the discharging network 19 which decouples the charging network and clamps the voltage at the output of the charging circuit to a lower value than that of the signal input, so that the top portion and the trailing edge from the input signal 11 are transmitted through the differential amplifier 15 substantially undistorted. After the end of the pulse the circuit automatically recovers and is ready to receive the next pulse.

If the rate of rise of the input signal 11 is less than the charging rate of charging network 17, then the voltage at the second input of the differential amplifier 15 remains higher than the voltage of the signal at input 13, so that no signal is transmitted by the differential amplifier 15.

Referring now to FIG. 2 of the drawings which illustrates the preferred embodiment of the invention, differential amplifier 21 includes triodes 23 and 25, whose cathodes are connected to the plate of triode 27. The cathode of triode 27 is connected to a −200 volt source through resistor 29. The grid of triode 27 is connected to ground through resistor 31 and to the −200 volt source through resistor 33.

The plate of triode 23 is connected to the wiper of potentiometer 35. The ends of potentiometer 35 are connected between ground and the junction of resistors 37 and 39. The other ends of resistors 37 and 39 are connected to a +250 volt source and ground, respectively. A filter capacitor 41 is connected in parallel with resistor 39. The plate of triode 25 is connected to the junction of resistors 37 and 39 through plate resistor 43.

A source of input signals 45, which may be derived from a character reader, is coupled to the grid of triode 23 through resistor 47. Capacitor 49 is connected between the grid of triode 23 and ground. The cathode of diode 51 is connected to the grid of triode 23 and the anode of diode 51 is connected to a −10 volt source. Diode 53 is connected between the grids of triodes 23 and 25 with its cathode being connected to the grid of triode 23. Charging capacitor 55 is connected between the grid of triode 25 and ground. The plate of triode 25 is also connected to the grid of triode 57 through resistor 59. Capacitor 61 is connected in parallel with resistor 59.

The cathode of triode 57 is grounded and the plate is connected to the junction of resistors 63 and 65. The other ends of resistors 63 and 65 are connected to the junction of resistors 37 and 39, and the junction of resistor 67 and the anode of diode 69, respectively. The other ends of resistor 67 and diode 69 are connected to a negative 200 volt source and ground, respectively. The anode of diode 71 is connected to the junction of resistors 71 and 67. The cathode of diode 65 is connected to the ungrounded end of capacitor 55 through resistor 73 and to ground through resistor 75.

In the illustrated embodiment, under quiescent conditions, the input rides at approximately —20 volts. Diode 51 is thereby forward biased and the grid of triode 23 is held at approximately —10 volts. The +250 volt source tends to charge capacitor 55 positively towards ground potential through resistors 37, 63, 65, diode 71 and resistor 73. The junction of resistor 65 and diode 71 is prevented from rising above ground level by the clamping action of diode 69. However, capacitor 55 is prevented from rising very much above the voltage at the grid of triode 23 by the action of diode 53 which is forward biased.

The forward voltage drop across diode 53 results in the grid of triode 25 being held at a slightly more positive potential than the grid of triode 23 so that triode 25 conducts and triode 23 is non-conducting. The voltage at the plate of triode 25 during quiescent conditions keeps triode 57 biased off.

Triode 27 is continually biased on since its cathode is connected to a —200 volt source through resistor 29 and its grid is coupled to ground potential through resistor 31. This combination constitutes a constant-current stage or source and is coupled in common to the cathodes of triodes 23 and 25.

Upon the occurrence of an input signal, the grid of triode 23 remains clamped at —10 volts until the input signal rises above —10 volts and back biases diode 51. As the input signal rises above this level, the diode 53 tends to become back biased, thereby releasing capacitor 55 to charge towards ground potential. If the rate of rise of the input signal is less than the predetermined charging rate of the capacitor 55 of the charging circuit, then the capacitor 55 remains charged to a voltage slightly more positive than the voltage at the grid of triode 23. Triode 25 remains conducting and triode 23 remains non-conducting. If, however, the rate of rise of the signal is greater than the predetermined charging rate of the capacitor 55, the voltage across the charging capacitor 55 is unable to keep up with the voltage at the grid of triode 23. As a result, diode 53 becomes back biased, triode 23 becomes more conducting and triode 25 becomes less conducting, due to their cathodes being coupled to a constant current source.

As a result of the decrease in conduction of triode 25, its plate voltage rises and biases the grid of triode 57 to saturation potential. This causes the voltage at the junction of resistors 63 and 65 to drop and clamps it at some value a few volts above ground. The —200 volt source then acts to cause the voltage at the junction of resistors 65 and 67 to drop to some value much less than ground, thereby back biasing diodes 69 and 71 and switching off the charging current to capacitor 55. The voltage at the grid of triode 25, therefore, stops increasing and becomes much less than the grid voltage of triode 23. Triode 25 becomes relatively non-conducting and triode 23, now supplied with most of the current from the constant current source, acts as an ordinary amplifier to pass the flat top and trailing edge portions of the input signal in a substantially undistorted form. At the end of a signal, the grid of triode 23 once again is clamped at —10 volts by diode 51. Diode 53 becomes forward biased and triode 25 becomse conducting, thereby turning off triode

57. Capacitor 55 is then discharged through diode 53, and the circuit is ready for another input. The output may be taken from the plate of triode 23.

It is clear to one skilled in the art that transistors or other active elements may equally well be used in my circuit instead of the vacuum tubes shown if appropriate changes are made in the component and voltage values and signal levels. The use of transistors would also allow the use of different polarity voltage sources than those shown in the drawing.

Another feature of my invention is that its use causes a substantial reduction in the noise level in the signal wave form since all signals of less than a predetermined magnitude, such as 10 volts in the illustrated embodiment, are blocked by the circuit. Therefore, no low level noise voltages are transmitted.

The following component values have been found to be suitable for use in the illustrated embodiment of my circuit.

| Component | Value |
|---|---|
| Triodes: | |
| 23 | ½ 12AX7 |
| 25 | ½ 12AX7 |
| 27 | ½ 5965 |
| Resistors: | |
| 29 | 150 |
| 31 | 47 |
| 33 | 100 |
| Potentiometer 35 | 50 |
| Resistors: | |
| 37 | 6.8 |
| 39 | 100 |
| Capacitor 41 | 0.1 |
| Resistors: | |
| 43 | 120 |
| 47 | 22 |
| Capacitor 49 | .002 |
| Diode 53 | 1N116 |
| Capacitor 55 | .002 |
| Triode 57 | ½ 5965 |
| Resistor 59 | 560 |
| Capacitor 61 | .0005 |
| Resistors: | |
| 63 | 100 |
| 65 | 100 |
| 67 | 270 |
| Diodes: | |
| 69 | 1N116 |
| 71 | 1N116 |
| Resistors: | |
| 73 | 1500 |
| 75 | 2700 |

All values of resistance given in K ohms.
All values of capacitance given in microfarads.

The above-listed component values and the voltage levels given in the description and the drawings are for illustrative purposes only and, as is clear to one skilled in the art, many other choices of both are available. It should also be clear that the circuit configuration shown and the uses set out for it are given by way of example only and should not be construed as limitations on the scope of my invention.

I claim:

1. A rise time discriminator circuit for passing only those input signals having rates of rise greater than a predetermined rate comprising:

two active elements each including a control electrode, the first of said active elements being biased in a normally non-conductive state and the second of said active elements being biased in a normally conductive state, means for coupling an input signal to the control electrode of said normally non-conductive active element, a capacitor coupled to the control electrode of said normally conductive active element, means independent of said input signal for charging said capacitor at said predetermined rate, means normally coupling said control electrodes, said last stated means being responsive to the occurrence of an input signal having a rate of rise greater than said predetermined rate for decoupling said control electrodes, and means responsive to said decoupling for reversing the conductive states of said active elements.

2. The combination of claim 1 wherein said means for reversing the conductive states includes a constant-current source and wherein each of said two active elements includes a current-carrying electrode commonly coupled to said constant-current source.

3. The combination of claim 1 wherein said means for coupling an input signal to the control electrode of said normally non-conductive active element includes unidirectional means coupled to a voltage source for automatically rejecting all signals having amplitudes of less than a predetermined minimum voltage level.

4. The circuit of claim 1 wherein said means normally coupling said control electrodes include a diode.

5. The combination of claim 1 wherein said means for reversing the conductive states includes switching means for halting the charging of said capacitor.

6. The combination of claim 5 wherein said switching means includes a normally non-conductive, active switching element having a control electrode coupled to said normally conductive active element, said normally non-conductive, active switching element being sensitive to a decrease in the conductivity of said normally conductive active element for switching to a conductive state in response to said decrease and decoupling said capacitor from said charging means.

7. A rate of rise discriminator circuit for passing only those proper input signals having rates of rise greater than a predetermined rate comprising:

a differential amplifier including first and second active elements, each having a control electrode, input means coupled to the control electrode of said first active element for supplying an input signal thereto, a charging circuit including, a charging capacitor coupled to the control electrode of said second active element, a voltage supply independent of said input signal, and means for charging said charging capacitor at said predetermined rate from said independent voltage source, and means for normally maintaining said first active element in a relatively non-conductive state and said second active element in a relatively conductive state, said means being responsive to the presence of said proper input signal for reversing said states and passing said proper input signal.

8. The circuit of claim 7 wherein said responsive means include a diode for normally coupling the control electrodes of said first and second active elements, said diode being responsive to the occurrence of said proper input signal for decoupling said control electrodes.

9. The circuit of claim 7 wherein said input means includes a diode and a voltage source coupled for eliminating all signals having magnitudes of less than a predetermined minimum voltage level,

10. The circuit of claim 7 wherein each of said first and second active elements includes a first and a second current-carrying electrode, said first current-carrying electrodes commonly coupling said first and second active elements, and wherein said differential amplifier also includes a circuit output associated with the second current-carrying electrode of said first active element and a second output associated with the second current carrying electrode of said second active element.

11. The circuit of claim 10 wherein said responsive means include a constant-current source for supplying a constant current to the commonly coupled first current-carrying electrodes of said first and second active elements.

12. The circuit of claim 11 wherein said constant current source includes a bias voltage source, a continuously conductive active element, and biasing resistors.

13. The circuit of claim 7 wherein said responsive means include switching means for isolating said charging capacitor from said independent voltage source.

14. The circuit of claim 13 wherein said switching means includes a normally non-conductive active element.

References Cited

UNITED STATES PATENTS

| | | | |
|---|---|---|---|
| 2,737,584 | 3/1956 | Hughes et al. | 328—111 |
| 3,073,971 | 1/1963 | Daigle | 307—263 |
| 3,073,972 | 1/1963 | Jenkins | 307—263 |

JOHN S. HEYMAN, Primary Examiner

B. P. DAVIS, Assistant Examiner

U.S. Cl. X.R.

307—263; 330—619; 328—132